(12) United States Patent
Jee et al.

(10) Patent No.: US 12,709,254 B2
(45) Date of Patent: Aug. 18, 2026

(54) BRAKE SYSTEM AND CONTROLLING METHOD THEREOF

(71) Applicant: HL MANDO CORPORATION, Gyeonggi-do (KR)

(72) Inventors: Hyun Jee, Gyeonggi-do (KR); Jaehyun Park, Gyeonggi-do (KR); Sera Hyeon, Gyeonggi-do (KR); Daejune Jung, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 15 days.

(21) Appl. No.: 19/048,781

(22) Filed: Feb. 7, 2025

(65) Prior Publication Data

US 2025/0313178 A1 Oct. 9, 2025

(30) Foreign Application Priority Data

Apr. 4, 2024 (KR) ........................ 10-2024-0046031

(51) Int. Cl.
*B60T 8/172* (2006.01)
*B60T 8/171* (2006.01)
(Continued)

(52) U.S. Cl.
CPC .............. *B60T 8/172* (2013.01); *B60T 8/171* (2013.01); *B60T 8/174* (2013.01); *B60T 8/26* (2013.01);
(Continued)

(58) Field of Classification Search
CPC ..... B60T 8/172; B60T 17/221; B60T 2270/40
See application file for complete search history.

(56) References Cited

U.S. PATENT DOCUMENTS 6,158,822 A * 12/2000 Shirai ..................... F16D 65/22 303/162
6,749,269 B1 * 6/2004 Niwa .................... B60T 13/741 303/20

(Continued)

FOREIGN PATENT DOCUMENTS

JP 2015-226373 12/2015
KR 10-1432786 9/2014

(Continued)

OTHER PUBLICATIONS

Office Action (1st) dated Aug. 27, 2025 for Korean Patent Application No. 10-2024-0046031 and its English translation provided by Applicant's foreign counsel.

*Primary Examiner* — Long T Tran
(74) *Attorney, Agent, or Firm* — WOMBLE BOND DICKINSON (US) LLP

(57) ABSTRACT

A brake system includes a sensor module including a motor current sensor and a force sensor, electric mechanical brake units mounted to wheels of a vehicle and including motors, respectively, and a controller configured to control one or more of the electric mechanical brake units, and the controller predicts states one of the motors of the electric mechanical brake units based on current signals of the motors detected by the motor current sensor, when at least one of the predicted states of the motors indicates that at least one of the motors fails, determines a failure level of the failed at least one of the motors based on sensor data obtained from the sensor module, calculates a requested torque of each of the wheels based on the determined failure level of the failed at least one of the motors, and controls a torque of each of the wheels based on the calculated requested torque of each of the wheels.

20 Claims, 11 Drawing Sheets

(51) Int. Cl.

| | |
|---|---|
| ***B60T 8/174*** | (2006.01) |
| ***B60T 8/26*** | (2006.01) |
| ***G07C 5/08*** | (2006.01) |
| ***H02P 21/00*** | (2016.01) |
| ***H02P 21/22*** | (2016.01) |
| ***H02P 21/36*** | (2016.01) |

(52) U.S. Cl.
CPC ......... *G07C 5/0808* (2013.01); *G07C 5/0816* (2013.01); *H02P 21/0014* (2013.01); *H02P 21/22* (2016.02); *H02P 21/36* (2016.02); *B60T 2270/406* (2013.01)

(56) References Cited

U.S. PATENT DOCUMENTS

| | | | | |
|---|---|---|---|---|
| 2019/0381895 | A1* | 12/2019 | Shindo | B60L 15/2081 |
| 2020/0039484 | A1* | 2/2020 | Satoh | B60T 7/042 |
| 2020/0377070 | A1* | 12/2020 | Yokoyama | B60T 13/741 |
| 2021/0078557 | A1* | 3/2021 | Kobune | B60T 13/741 |
| 2025/0196823 | A1* | 6/2025 | Shibata | B60T 8/172 |

FOREIGN PATENT DOCUMENTS

| | | |
|---|---|---|
| KR | 10-2019-0072165 | 6/2019 |
| KR | 10-2020-0100840 | 8/2020 |

* cited by examiner

MOTOR CURRENT SIGNAL
BRAKING FORCE MEASUREMENT SIGNAL
210
300
STATE DETERMINATION MODULE
305
MACHINE LEARNING MODEL
310
FAILURE LEVEL DETERMINATION MODULE
320
CONTROL MODULE

TORQUE
Mx
Thd1
(a) FIRST WHEEL
TORQUE
Thd2
(b) SECOND WHEEL
TORQUE
(c) THIRD WHEEL
TORQUE
(d) FOURTH WHEEL

TORQUE
Mx
Thd1
Thd3
(a) FIRST WHEEL
TORQUE
Thd4
Thd2
(b) SECOND WHEEL
TORQUE
(c) THIRD WHEEL
TORQUE
(d) FOURTH WHEEL

TORQUE
Mx
Thd5
Thd6
TORQUE
TORQUE
TORQUE
(a) FIRST WHEEL
(b) SECOND WHEEL
(c) THIRD WHEEL
(d) FOURTH WHEEL

BRAKE SYSTEM AND CONTROLLING METHOD THEREOF

CROSS-REFERENCE TO RELATED APPLICATIONS

This application claims the priority of Korean Patent Application No. 10-2024-0046031 filed on Apr. 4, 2024, in the Korean Intellectual Property Office, the disclosure of which is incorporated herein by reference herein in its entirety.

BACKGROUND

Field

The present disclosure relates to a brake system which predicts a failure of a motor to control a torque of each wheel and a controlling method thereof.

Description of the Related Art

Generally, the vehicle controls a vehicle brake system to obtain a driver requested toque according to a displacement amount of a brake pedal when a pedal effort is applied to a pedal according to a driver's brake intension, calculate a requested torque of each wheel based on the obtained driver requested torque, and then predict the requested torque obtained by calculating the torque of each wheel.

In a vehicle, an electric mechanical brake (EMB) which controls braking using a motor is provided in wheels. The EMB is a main component which is directly related to the vehicle safety accident. However, even though the performance thereof is degraded, the EMB continuously performs the normal operation until the failure occurs so that there is a problem in that the vehicle safety is degraded.

Accordingly, a brake system and a controlling method thereof are requested to prevent dangerous situations that may occur in a vehicle environment in advance by predicting performance degradation due to EMB motor abnormality in advance rather than after diagnosis.

SUMMARY

An aspect of the present disclosure is to provide a brake system for predicting a failure of at least one motor in advance and a controlling method thereof.

According to an aspect of the present disclosure, a brake system includes a sensor module including a motor current sensor and a force sensor; an electric mechanical brake units mounted to wheels of a vehicle and including motors, respectively; and a controller configured to control one or more of the electric mechanical brake units, and the controller predicts states of the motors of the electric mechanical brake units based on current signals of the motors detected by the motor current sensor, when at least one of the predicted states of the motors indicates that at least one of the motors fails, determines a failure level of the failed at least one of the motors based on sensor data obtained from the sensor module, calculates a requested torque of each the wheels based on the determined failure level of the failed at least one of the motors, and controls a torque of each of the wheels based on the calculated requested torque of each of the wheels.

The controller may be configured to obtain prediction result data representing a predicted motor state using a machine learning model trained to predict the states of the motor.

The states of the motors may include normal, bearing failure, rotor imbalance, or axis misalignment.

The current signals of the motors may include two current signals having different phases among three-phase current signals of the motors.

The controller may be configured to control to generate a remaining phase current signal of the three-phase current signals using the two current signals having the different phases, perform direct quadrature (DQ) transformation on the three-phase current signals to obtain DQ-axis current signals, and generate input data for a machine learning model based on the three-phase current signals and the DQ-axis current signals.

The controller may be configured to obtain prediction result data representing a predicted motor state using a machine learning model trained to predict a motor state based on input data including frequency data and amplitude data of a first phase current signal, frequency data and amplitude data of a second phase current signal, among three-phase current signals, and frequency data of a quadrature-axis (Q-axis) current signal.

The prediction result data may include a plurality of labels including a label corresponding to the normal, a label corresponding to the bearing failure, a label corresponding to the rotor imbalance, and a label corresponding to the axis misalignment and a prediction probability value for each of the plurality of labels.

The controller may be configured to determine a label corresponding to a predetermined threshold probability value or higher, rather than a prediction probability value corresponding to the label corresponding to normal, among the plurality of labels, which is equal to or higher than a threshold probability value as the motor state.

The threshold probability value may be calculated by applying a predetermined weight to the prediction probability value corresponding to the label corresponding to the normal.

The sensor data may include a signal associated with a braking force measured by the force sensor, and the controller may determine the failure level based on the signal associated with the measured braking force and the DQ-axis current signals.

If a direct-axis (D-axis) current value and a Q-axis current value of a current signal of one of the motors increase to be equal to or higher than a predetermined current value and the measured braking force decreases to be lower than a predetermined braking force, the controller may predict a state of the one of the motors as one of the bearing failure or the rotor imbalance.

If a D-axis current value and a Q-axis current value of a current signal of one of the motors decrease to be lower than a predetermined current value and the measured braking force decreases to be lower than a predetermined braking force, the controller may predict a state of the one of the motors as the axis misalignment.

The failure level includes a higher failure level and a lower failure level which has a failure level, lower than the higher failure level and if the determined failure level of the failed at least one of the motors is the lower failure level among the higher and lower failure levels, the controller may control a display to output information indicating the determined failure level of failed at least one of the motors.

The controller may be configured to determine whether the measured braking force reaches a target braking force within a predetermined first threshold time and if the measured braking force does not reach the target braking force within the first threshold time, determine the failure level as the lower failure level among the higher and lower failure levels.

The controller may be configured to determine whether a brake response time when the measured braking force reaches a target braking force is within a predetermined second threshold time, and if the brake response time when the measured braking force reaches the target braking force the second threshold time, determine the failure level as the lower failure level among the higher and lower failure levels.

The controller may be configured to determine a requested torque value of a wheel corresponding to at least one motor, which is predicted to fail among the motors of the electric mechanical brake units, to be lower than a predetermined threshold requested torque value, and determine one or more requested torque values of wheels corresponding another motor or other motors, which are not predicted to fail among the motors of the electric mechanical brake units, to be equal to or higher than the predetermined threshold requested torque value.

According to an aspect of the present disclosure, a method of controlling a brake system may include predicting states of motors of electric mechanical brake units based on current signals of the motors detected by a motor current sensor, when at least one of the predicted states of the motors indicates that at least one of the motors fails, determining a failure level of the failed at least one of the motors based on sensor data obtained from a sensor module including the motor current sensor, calculating a requested torque of each wheel based on the determined failure level of the failed at least one of the motors, and controlling a torque of each wheel based on the calculated requested torque of the each wheel.

The method may further include: a step of controlling to generate a remaining phase current signal of the three-phase current signals using the two current signals having the different phases; a step of performing direct quadrature (DQ) transformation on the three-phase current signals to obtain DQ-axis current signals; and a step of generating input data for a machine learning model based on the three-phase current signals and the DQ-axis current signals.

The method may further include obtaining prediction result data representing a predicted motor state using a machine learning model trained to predict a motor state based on input data including frequency data and amplitude data of a first phase current signal, frequency data and amplitude data of a second phase current signal, among three-phase current signals, and frequency data of a quadrature-axis (Q-axis) current signal.

The predicting of the states of the motors of the electric mechanical brake units may include: determining a label having a prediction probability value corresponding to the label corresponding to the normal, among the plurality of labels, which is equal to or higher than a threshold probability value as the motor state.

The determining of the failure level of the failed at least one of the motors may include: determining the failure level based on the signal associated with the measured braking force and the DQ-axis current signals.

The method may further includes: displaying information indicating the determined failure level of the failed at least one of the motors.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
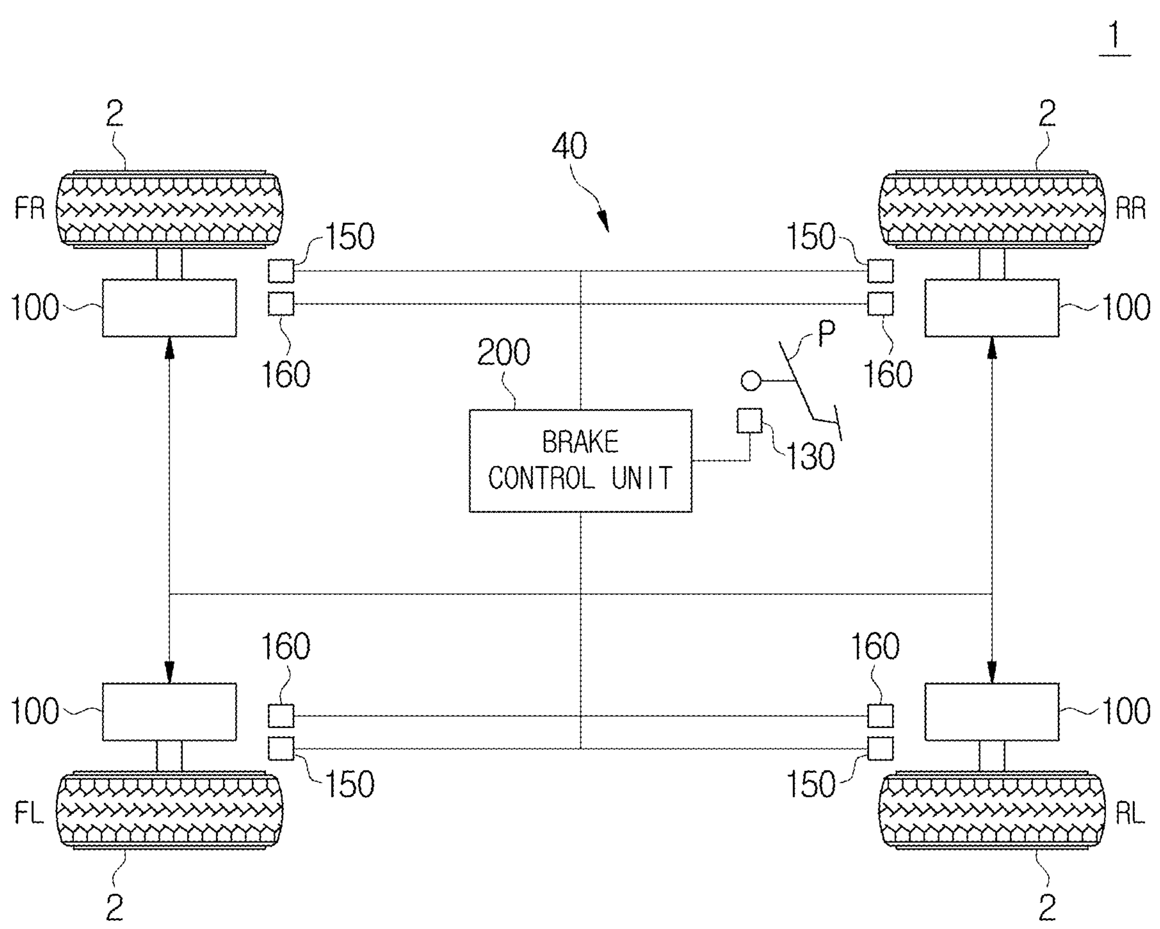
FIG. 1 illustrates a brake system included in a vehicle according to one exemplary embodiment.

Hereinafter, the exemplary embodiment of the present disclosure will be described with reference to the accompanying drawings and exemplary embodiments as follows. Scales of components illustrated in the accompanying drawings are different from the real scales for the purpose of description, so that the scales are not limited to those illustrated in the drawings.

Like reference numerals denote like elements throughout the specification. The specification does not describe all the elements of the exemplary embodiments, but general contents in the technical field to which the present invention belongs or the redundant description of the exemplary embodiments may be omitted. Terms "unit, module, member, and block" used in the specification may be implemented by software or hardware and according to the exemplary embodiments, a plurality of "units, modules, members, and blocks" may be implemented by one component or one "unit, module, member, and block" may include a plurality of components.

Throughout this specification, when it is described that a part is "coupled" to another part, the part may be directly coupled to the other part and also indirectly connected to the other part and the indirect connection includes connection with a wireless communication network therebetween.

In addition, unless explicitly described to the contrary, the word "comprise" and variations such as "comprises" or "comprising", will be understood to imply the inclusion of stated elements but not the exclusion of any other elements.

Through the specification of the present disclosure, when one member is located "on" the other member, the member may be adjacent to the other member or a third member may be disposed between the above two members.

The terms such as first or second may be used to distinguish one component from the other component, but the component is not limited by the above-described terms.

A singular form may include a plural form if there is no clearly opposite meaning in the context.

In each step, the reference symbol is used for the convenience of description so that the reference symbol does not describe the order of each step and the steps may be carried out in a different order from the specified order unless specific order is clearly described in the context.

Hereinafter, operating principles and exemplary embodiments of the present disclosure will be described with reference to the accompanying drawings.

FIG. 1 illustrates a brake system included in a vehicle according to one exemplary embodiment.

Referring to FIG. 1, a vehicle 1 includes a vehicle body which forms its exterior and accommodates a driver and/or luggage, a chassis which includes vehicle 1 parts other than the vehicle body, and wheels 2 which rotate to enable the vehicle to move.

The vehicle 1 includes a brake system 40 and the brake system 40 generates a brake torque to stop the vehicle 1 and includes an electric mechanical brake unit 100 and a brake control unit (BCU) 200.

In front wheels FR and FL and rear wheels RR and RL of the vehicle 1, the electric mechanical brake units 100 which generate a braking force may be provided, but the present disclosure is not limited thereto and the electric mechanical brake units 100 may be provided only in the rear wheels. In the present exemplary embodiment, an example that the electric mechanical brake units 100 are provided in all the front wheels and the rear wheels will be described.

The brake control unit 200 includes a controller ECU (a controller 210 of FIG. 2 to be described below) which generates a control signal to control an operation of the electric mechanical brake unit 100 to generate a braking force depending on a brake intention according to a driver's manipulation of brake pedal P.

The electric mechanical brake unit 100 provided in wheels 2 may include an electric mechanical brake 110 and an electric control unit 120 which controls an operation of the electric mechanical brake 110 according to the control signal of the controller 210. The electric mechanical brake 110 may include a carrier with one pair of pad plates provided to pressurize a brake disk rotating together with the wheel 2 of the vehicle 1, a caliper housing which is slidably installed in the carrier to operate one pair of pad plates, a piston which is installed in the caliper housing to move forward and backward, an actuator which generates and provides a driving force to move the piston, a power conversion unit which receives the rotational driving force provided from the actuator, converts it into linear motion, and transmits it to the piston 110 to implement the axial forward and backward movement of the piston, and a detection unit that measures the adhesion or fastening force between the brake disk 13 and the brake pad 10.

Specifically, the actuator may be provided to include a speed reduction device having a motor and a plurality of speed reduction gears and generate a driving force with a power supplied from a power device disposed in the vehicle 1. The actuator is connected to the other end portions of a spindle to transmit the generated driving force to a rotational motion of the spindle. The actuator may be installed at the outside of the caliper housing and the speed reduction device may be applied with various structures, such as a planetary gear assembly or a worm structure, to reduce the power of the motor and provide it to the spindle. The motor may rotate the spindle to allow a nut to move forward and backward to pressurize or depressurize the piston.

The motor may include a rotary shaft which is rotatably provided. The motor may include a rotor connected to the rotary shaft and a stator fixed to the housing. For example, the rotor may include a permanent magnet in which N poles and S poles are alternately disposed along an outer surface and the stator may include a plurality of teeth disposed along the outer surface of the rotor and a plurality of coils which encloses each of the plurality of teeth.

The rotor may rotate by a magnetic interaction with the stator and the rotation of the rotor may be provided to the rotary shaft. The motor may receive a driving current from the brake control unit 200. The plurality of coils included in the stator may form a magnetic field which rotates around the rotor by the driving current and the rotor may rotate by the magnetic interaction between the magnetic field of the rotor and the magnetic field of the stator.

According to various exemplary embodiments, the motor is a three-phase motor and for example, may be a three-phase EMB motor, but is not limited thereto. The three-phase EMB motor may include three-phase coils (u-phase, v-phase, w-phase) installed on the stator side and permanent magnets magnetized on the rotor side. The driving circuit of the EMB motor flows the current to each phase of the coil of the stator of the three-phase EMB motor and the rotor of the motor rotates by a magnetic field based on a current supplied from the driving circuit. In order to continuously rotate the rotor of the motor in one direction, switching elements which detect a position (a magnitude of the magnetic field of the rotor) of the rotor and switches the direction of the current flowing in each phase of the coil according to the detected position of the rotor may be sequentially turned on or off.

In the present exemplary embodiment, it has been described that the electric mechanical brake unit 100 is a caliper type EMB, but it is not limited thereto and the electric mechanical brake unit 100 may be a drum type EMB.

Figure 2:
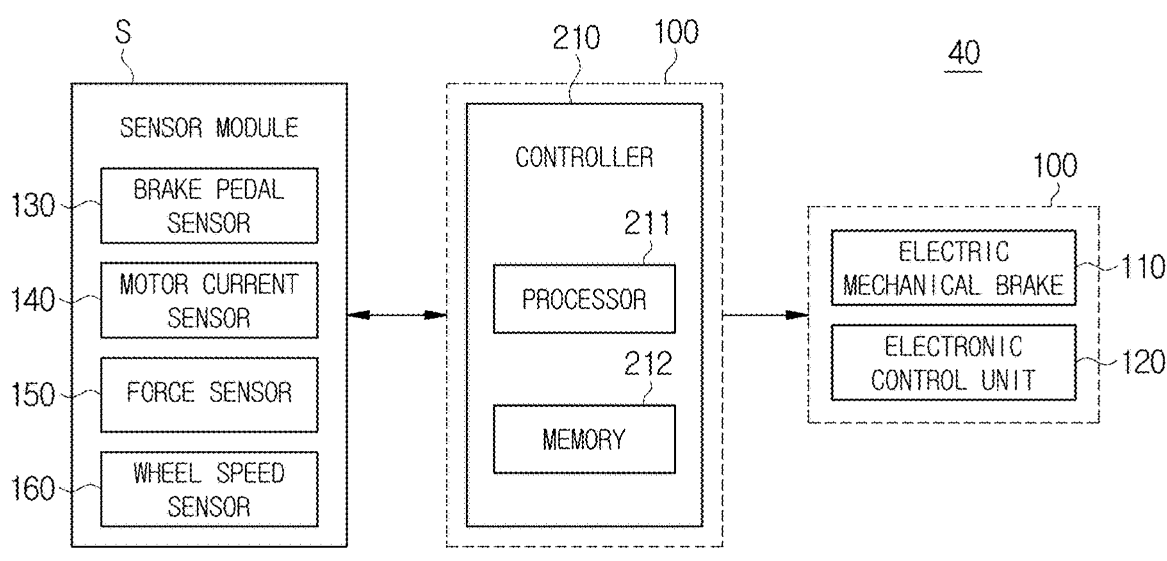
FIG. 2 illustrates a control configuration of a brake system according to one exemplary embodiment.

FIG. 2 illustrates a control configuration of a brake system according to one exemplary embodiment.

As illustrated in FIG. 2, the brake system 40 may include a sensor module S, an electric mechanical brake unit 100 provided so as to correspond to wheels 2 of the vehicle 1, and a brake control unit 200 provided to control an operation of the electric mechanical brake unit 100. However, configurations included in each of the sensor module S, the brake control unit 200, and the electric mechanical brake unit 100 illustrated in FIG. 2 do not correspond to essential configurations and some of them may be omitted.

The brake control unit 200 may control the brake of each wheel 2 based on data obtained through the sensor module S.

The sensor module S may include a brake pedal sensor 130, a motor position sensor 140, a force sensor 150, and a wheel speed sensor 160.

The brake pedal sensor 130 may detect the distance traveled by the brake pedal P, a traveling speed, and/or a pedal effort applied to the brake pedal P by the driver's brake intention, and provide a detection signal corresponding to the detected traveled distance, traveling speed, and/or pedal effort to the brake control unit 200. The brake control unit 200 may determine a brake request of the driver depending on the sensing signal of the brake pedal sensor 130.

The motor current sensor 140 may measure a current value of each phase (UVW) of the motor. For example, the motor current sensor 140 may measure currents of two terminals, among U, V, and W terminals of the motor. The motor current sensor 140 may be directly connected to the controller 210 through a hard wire or be connected to the controller 210 through a communication network and provide an electric signal (a motor current signal) corresponding to the measured current value to the brake control unit 200.

The force sensor 150 is provided so as to correspond to each electric mechanical brake unit 100 to measure (or sense) the adhesion or fastening force between the brake disk and the brake pad and provide a sensing signal corresponding to the measured adhesion or fastening force to the brake control unit 200.

The wheel speed sensor 160 may measure a rotation speed of each wheel 2 provided in the vehicle 1. The wheel speed sensor 160 is provided in each of the plurality of wheels and may measure a rotation speed of each of the plurality of wheels. For example, the wheel speed sensor 160 may include a hall sensor which detects a magnetic field and a change thereof or a coil which detects a change in the magnetic field.

The wheel speed sensor 160 may provide the sensing signal (speed signal) corresponding to the measured rotation speed to the brake control unit 200.

The brake control unit 200 may provide a control signal to the electric mechanical brake unit 100 to allow the vehicle 1 to brake according to the brake request of the driver.

According to the disclosed exemplary embodiment, the controller 210 of the brake control unit 200 may include a processor 211 and a memory 212.

The processor 211 may provide a control signal to control operations of configurations included in the electric mechanical brake unit 100 according to the brake request of the driver.

The memory 212 may store or remember programs and data to implement operations to control the configurations included in the electric mechanical brake unit 10.

The memory 212 provides the stored program and data to the controller 210 and may store temporary data which is generated during the operation of the controller 210. For example, the memory 211 may include a volatile memory such as a static random access memory (S-RAM) or a dynamic random access memory (D-RAM) and a non-volatile memory such as a read only memory (ROM), an erasable programmable read only memory (EPROM), or a flash memory.

The processor 211 may be electrically connected to the sensor module S.

The processor 211 processes electrical signals received from the brake pedal sensor 130, the motor current sensor 140, the force sensor 150, and the wheel speed sensor 160 and may provide a brake control signal to the electric mechanical brake unit 100 based on the processed electrical signal.

According to the disclosed exemplary embodiment, the processor 211 obtains a motor current signal for the motor of the electric mechanical brake unit 100 from the motor current sensor 140 and may determine a state of the motor based on the obtained motor current signal. The processor 211 may control an operation of the electric mechanical brake unit 100 based on the determined motor state.

Hereinafter, an operation of determining a motor state in the controller 210 according to the disclosed exemplary embodiment will be described in detail.

Figure 3:
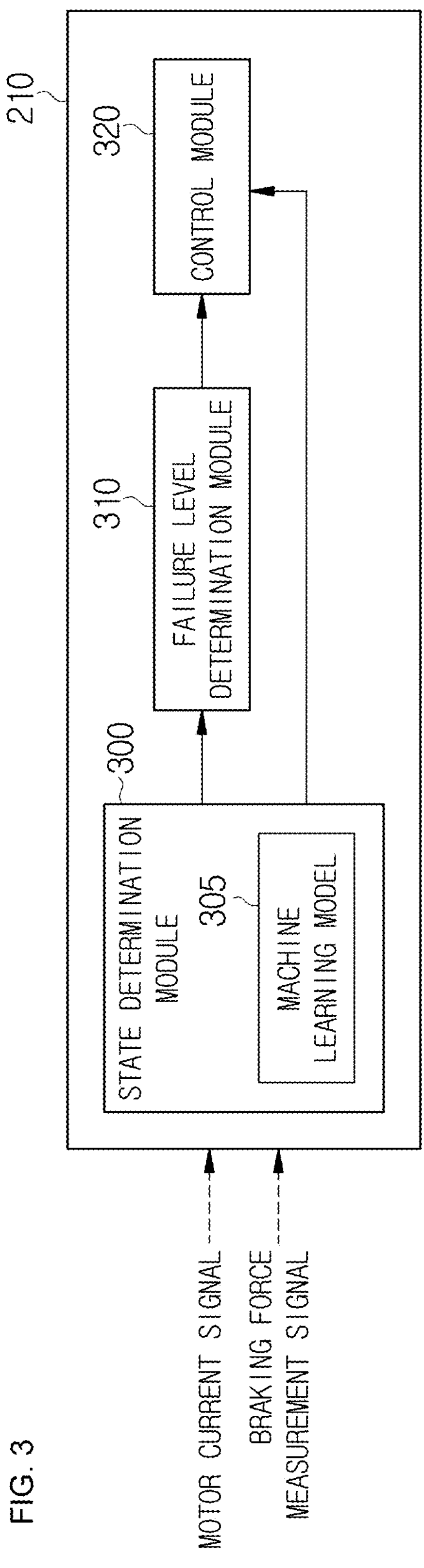
FIG. 3 illustrates a functional module of a controller included in a brake control unit according to one exemplary embodiment.

FIG. 3 illustrates a functional module of a controller included in a brake control unit according to one exemplary embodiment.

Referring to FIG. 3, the controller 210 may functionally include a plurality of modules. Each module may be a hardware module (for example, ASIC or FPGA) included in the processor 211 or a software module (for example, an application program or data) stored in the memory 212. In the present exemplary embodiment, an example that there is a brake request of the driver will be described.

The controller 210, as illustrated in FIG. 3, may include a state determination module 300, a failure level determination module 310, and a control module 320.

The state determination module 300 receives a motor current signal from the motor current sensor 140 and may determine a motor state based on the received motor current signal. Here, the current signal of one of the motors may include signals representing current values measured in two or more phases (at least two of U, V, and W) among three phases of the motor (for example, a three-state motor). In order to determine a state of the one of the motors, the state determination module 300 may use a machine learning model 305 which is trained to predict a motor state based on a motor current signal.

The state determination module 300 determines a plurality of prediction factors used to predict a motor state by converting the motor current signal obtained from the motor current sensor 140 and may use the determined prediction factors as input data of the machine learning model 305.

For example, when two-phase current signals obtained from the motor current sensor 140 include a U-phase current signal (e.g., a second phase signal) and a V-phase current signal (e.g., a first phase signal), the state determination module 300 may estimate a remaining phase current (W-phase current) signal using two-phase current signals and convert the three-phase current signal into the two-phase signal. In other words, the state determination module 300 performs direct quadrature (DQ) transformation on the UWV phase current signal to obtain a DQ-axis current signal.

The state determination module 300 transforms the UV phase and DQ-axis current signals into a harmonic signal using the Fast Fourier Transform (FFT) and may determine input data for predicting a motor state based on at least one peak value which is a predetermined threshold value or higher, among peak values of the harmonic signal. When all the peak values of the harmonic signal obtained by the Fast Fourier Transform are used as input data, a memory usage is increased so that in order to prevent the increased memory usage, at least one peak value which is a threshold value or higher, among the peak values may be used.

In order to determine the input data, the state determination module 300 may perform variance analysis on at least one peak value which is the predetermined threshold value or higher, among peak values of the harmonic signal. For example, the variance analysis may be analysis of variance (ANOVA) or one-way ANOVA, but is not limited thereto.

The state determination module 300 may determine data for predicting states of motors, among data (for example, frequency data and amplitude data) related to a plurality of current signals (UV phase and DQ-axis current signals) as input data, by means of the variance analysis on at least one peak value. For example, the state determination module 300 may obtain F-statistics and P-values for data (frequency data and amplitude data of UV-phase current signal and frequency data and amplitude data of the DQ-axis current signal) by the variance analysis, as represented in Table 1.

In order to determine the motor state based on the prediction result data 410, the state determination module 300 may determine a label corresponding to a predetermined threshold probability value or higher, rather than a predicted probability value corresponding to a label corresponding to normal, among the plurality of labels, as the motor state. In other words, the state determination module 300 assigns (or applies) a weight to the prediction probability value corresponding to a label corresponding to the normal to calculate a threshold probability value and may determine labels corresponding to the generated threshold probability value or higher as a motor state. For example, when the prediction probability value corresponding to the label corresponding to the normal is 30%, the state determination module 300 applies a weight of 15% to the prediction probability value corresponding to the label corresponding to the normal to generate a threshold probability value of 45%. The state determination module 300 determines a label corresponding to a threshold probability value of 45% or higher as a motor state, so that when there is no label corresponding to a threshold probability value of 45% or higher, the state determination module 300 may determine the motor state as a normal state.

TABLE 1

| | U-phase | | V-phase | | Q-axis | | D-axis | |
|---|---|---|---|---|---|---|---|---|
| Current FFT | Frequency data | Amplitude data | Frequency data | Amplitude data | Frequency data | Amplitude data | Frequency data | Amplitude data |
| F-statistic | 173.831 | 85.493 | 391.820 | 41.756 | 2.619 | 1.002 | 1.509 | 1.290 |
| P-value | 2.45E−112 | 3.18E−55 | 1.13E−252 | 6.E−27 | 0.049 | 0.391 | 0.210 | 0.276 |

As represented in Table 1, when P values for each data are obtained, the state determination module 300 may determine frequency data and amplitude data of the U-phase current signal, frequency data and amplitude data of the V-phase current signal, and frequency data of the Q-axis current signal which are a predetermined threshold value (for example, 0.05) or lower, as input data.

An operation of the state determination module 300 which predicts a motor state using a machine learning model 305 trained to predict a motor state based on the input data determined as described above will be exemplarily described with reference to FIG. 4.

Figure 4:
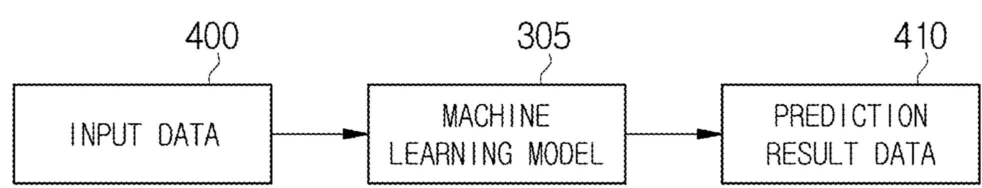
FIG. 4 illustrates an exemplary diagram for explaining a prediction operation of a machine learning model according to one exemplary embodiment.

FIG. 4 illustrates an exemplary diagram for explaining a prediction operation of a machine learning model according to one exemplary embodiment.

Referring to FIG. 4, a machine learning model 305 which is trained to predict the states of the motors with the above-described input data 400 as an input and output prediction result data 410 is illustrated.

The state determination module 300 may input input data (that is, frequency data and amplitude data of the UV-phase current signal and frequency data of the Q-axis current signal) 400 to the machine learning model 305 and obtain the prediction result data 410 using the machine learning model 305. Here, the prediction result data 410 may include a label and a prediction probability value for at least one of a normal state, a first failure state (bearing failure), a second failure state (rotor imbalance), and a third failure state (axis misalignment).

According to one exemplary embodiment, the machine learning model 305 may be based on various algorithms for predicting or estimating data. Here, various algorithms may be algorithms based on machine learning for predicting or estimating data. For example, the machine learning model 305 may be based on K-NN, Naïve Bayes, support vector machine (SVM), decision trees, multi-layer perception (MLP), random forest, or a combination thereof, but is not limited thereto and may be based on an artificial neural network model, such as convolutional neural network (CNN), recurrent neural network (RNN), and/or long short term memory (LSTM).

When a prediction probability value corresponding the bearing failure, among the plurality of failure labels, is 45% or higher, the state determination module 300 may determine the motor state as the bearing failure.

When the motor state is determined as described above, the state determination module 300 may provide motor state data representing the determined motor state to the failure level determination module 310.

Figure 5:
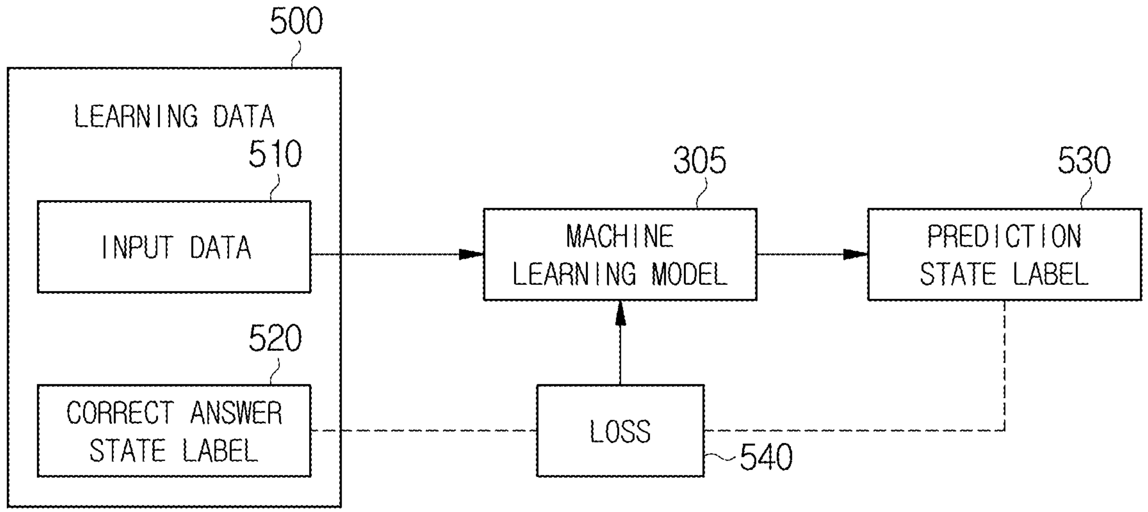
FIG. 5 illustrates an exemplary diagram for explaining a learning operation of a machine learning model according to one exemplary embodiment.

FIG. 5 illustrates an exemplary diagram for explaining a learning operation of a machine learning model according to one exemplary embodiment.

Referring to FIG. 5, learning data 500 used to train the machine learning model 305 may include input data 510 obtained so as to correspond to each of a normal state, a first failure state, a second failure state, and a third failure state and a correct answer state label 520 used as correct answer data (that is, a ground truth).

The state determination module 300 may train the machine learning model 305 to input the input data 510 obtained so as to correspond to each state of the motor for training the model to the machine learning model 305, predict a motor state based on the input data 510, and output the prediction state label 530 which represents the predicted motor state.

Specifically, the state determination module 300 may calculate a loss 540 for the prediction state label 530 and train the machine learning model 305 to minimize the calculated loss 540 while updating a weight of the machine learning model 305. Here, the loss 540 may refer to a difference between the prediction state label 530 which is an output value of the machine learning model 305 and the correct answer state label 520 corresponding to the ground truth. In order to calculate the loss, the state determination module 300 may use a loss function, such as mean squared error (MSE) loss, perceptual loss, structural similarity index (SSIM) loss and/or VGG loss, but is not limited thereto, and may use various loss functions to allow the difference of two values to converge to a minimum threshold value, such as "0".

Referring to FIG. 3 again, when the state determination module 300 determines that the motor state is failure, the failure level determination module 310 may determine a failure level based on the above-described DQ current signal together with a braking force (clamping force).

In order to determine a motor performance level, the failure level determination module 310 may collect various data related to the motor and determine factors which are correlated with motor performance degradation among the collected data. For example, the failure level determination module 310 may obtain Pearson correlation coefficients by means of the Pearson correlation analysis between the collected data and the motor performance degradation as represented in Table 2.

TABLE 2

| Ranking | Analysis factor | Correlation coefficient | Remarks |
|---|---|---|---|
| 1 | Braking force (Clamping force) | 1 | |
| 2 | Q-axis current | 0.887 | Major influence factor of motor torque |
| 3 | D-axis current | 0.881 | Major influence factor of motor speed |

As represented in Table 2, when the correlation coefficient for each factor is obtained, the failure level determination module 310 may determine that the braking force, the Q-axis current signal, and the D-axis current signal are related to the motor performance degradation.

The failure level determination module 310 may determine a failure level corresponding to at least one of the first failure state, the second failure state, and the third failure state, based on the signal associated with the measured braking force, the Q-axis current signal, and the D-axis current signal obtained by the force sensor 150. For example, when the failure state of the motor is "bearing failure", the D-axis current and the Q-axis current may increase, but the braking force may decrease. In this case, if a difference between the obtained D-axis current value and a D-axis current value corresponding to a normal value is equal to or higher than a predetermined threshold value, a difference between the Q-axis current value and a Q-axis current value corresponding to a normal value is equal to or higher than a predetermined threshold value, and a difference between the obtained braking force and a braking force corresponding to a normal value is lower than a predetermined threshold value, the failure level determination module 310 may determine the failure level as a failure level 1 (e.g., a higher failure level) for the bearing failure.

According to various exemplary embodiments, when the failure state of the motor is "rotor imbalance", the D-axis current and the Q-axis current may increase, but the braking force may decrease. In this case, if a difference between the obtained D-axis current value and a D-axis current value corresponding to a normal value is equal to or higher than a predetermined threshold value, a difference between the obtained Q-axis current value and a Q-axis current value corresponding to a normal value is equal to or higher than a predetermined threshold value, and a difference between the obtained braking force and a braking force corresponding to a normal value is lower than a predetermined threshold value, the failure level determination module 310 may determine the failure level as a failure level 1 for the rotor imbalance.

According to various exemplary embodiments, when the failure state of the motor is "axis misalignment", all the D-axis current, the Q-axis current, and the braking force may decrease. In this case, if a difference between the obtained D-axis current value and a D-axis current value corresponding to a normal value is lower than a predetermined threshold value, a difference between the obtained Q-axis current value and a Q-axis current value corresponding to a normal value is lower than a predetermined threshold value, and a difference between the obtained braking force and a braking force corresponding to a normal value is lower than a predetermined threshold value, the failure level determination module 310 may determine the failure level as a failure level 1 for the axis misalignment.

In the meantime, the failure level determination module 310 may determine whether the measured braking force reaches a target braking force within a predetermined first threshold time and if the measured braking force does not reach the target braking force within the first threshold time, may determine the failure level as a failure level 2 (e.g., a lower failure level). According to various exemplary embodiments, the failure level determination module 310 may determine whether a brake response time when the measured braking force reaches the target braking force falls within a predetermined second threshold time and if the brake response time when the measured braking force reaches the target braking force is out of the second threshold time, may determine the failure level as a failure level 2. According to various exemplary embodiments, when a driver requests posture control, the failure level determination module 310 may determine whether the braking force reaches the driver's requested braking force, and if the braking force does not reach the driver's requested braking force, may determine the failure level as the failure level 2. According to various exemplary embodiments, the failure level determination module 310 may determine the failure level 2 by considering both the time to reach the target braking force and the brake response time, but is not limited thereto and a criterion for determining a failure level 2 may vary depending on the performance of the vehicle. According to various exemplary embodiments, the failure level 2 may have a failure level lower than the failure level 1.

The control module 320 may generate a control signal for controlling an operation of the electric mechanical brake unit 100 based on the failure level determined by the failure level determination module 310 and transmit the generated control signal to the electric mechanical brake unit 100.

Specifically, the control module 320 may determine a target braking force according to the brake request of the driver and calculate a requested torque of each wheel 2 to reach a determined target braking force. In other words, when a failure of a motor provided in at least one wheel, among the plurality of wheels, is predicted, the control module 320 may calculate a requested torque of each wheel 2 based on the failure level of the motor which is predicted to fail. In other words, the control module 320 may redistribute the requested torque according to a performance level of the other motors, according to a performance level of the motor which is predicted to fail. According to various exemplary embodiments, the controller 210 may determine a requested torque value of a wheel corresponding to the at least one motor, which is predicted to fail among the motors of the electric mechanical brake units, to be lower than predetermined threshold requested torque value. And the a controller 210 may determine one or more requested torque values of wheels corresponding another motor or other motors, which are not predicted to fail among the motors of the electric mechanical brake units, to be equal to or higher than the predetermined threshold requested torque value.

An operation of the control module for calculating a requested torque of each wheel based on the failure level of the motor will be described with reference to FIGS. 6 to 9.

Figure 6:
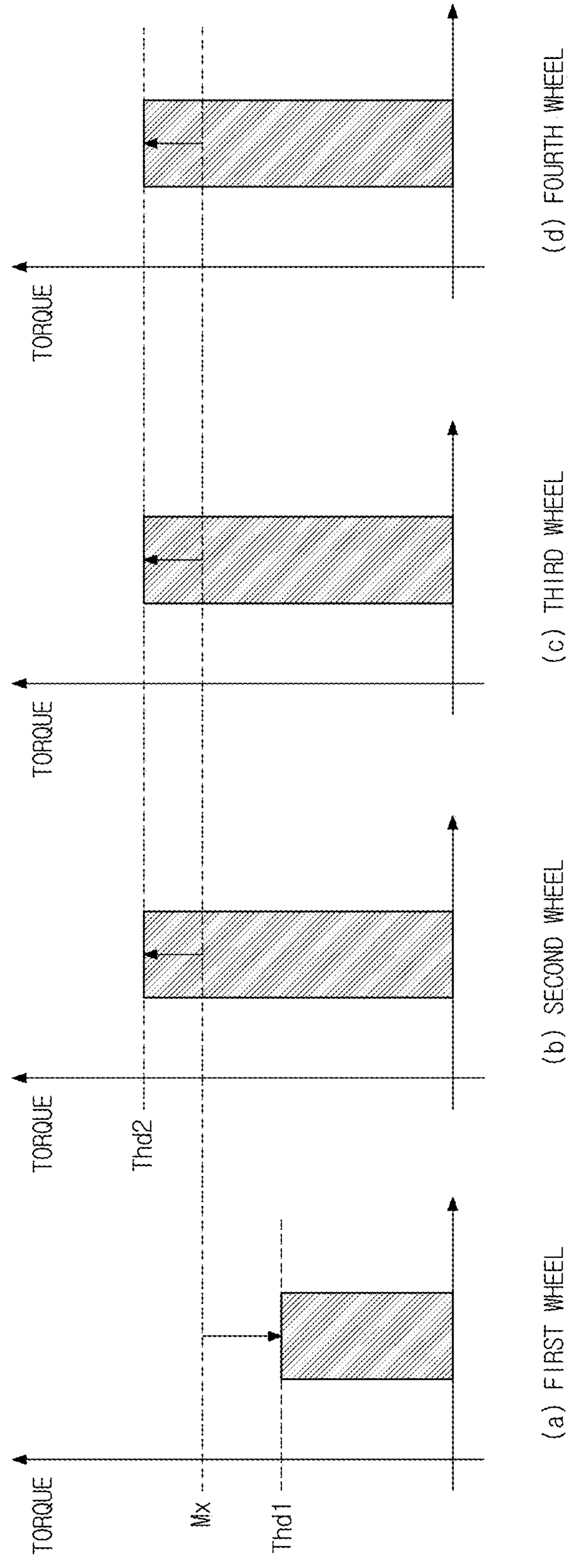
FIGS. 6 and 7 illustrate exemplary diagrams for explaining an operation of a control module when a motor of a first wheel according to one exemplary embodiment is predicted to fail.
Figure 7:
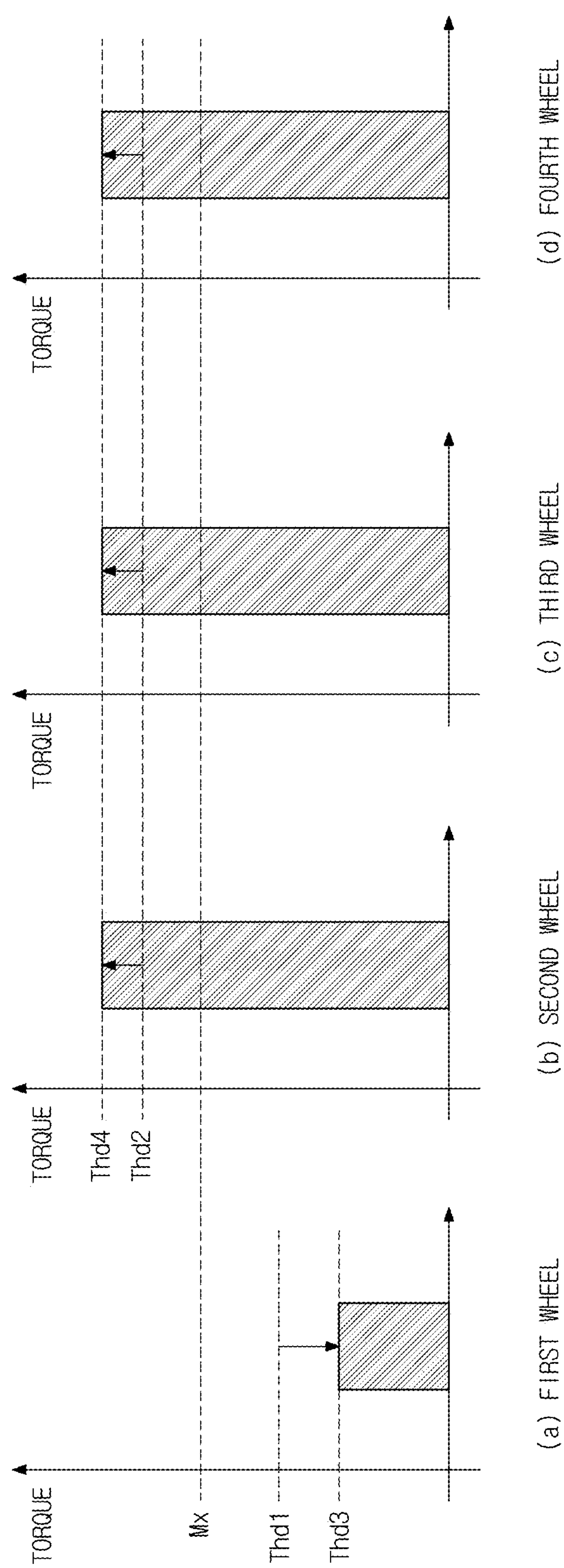
Figure 8:
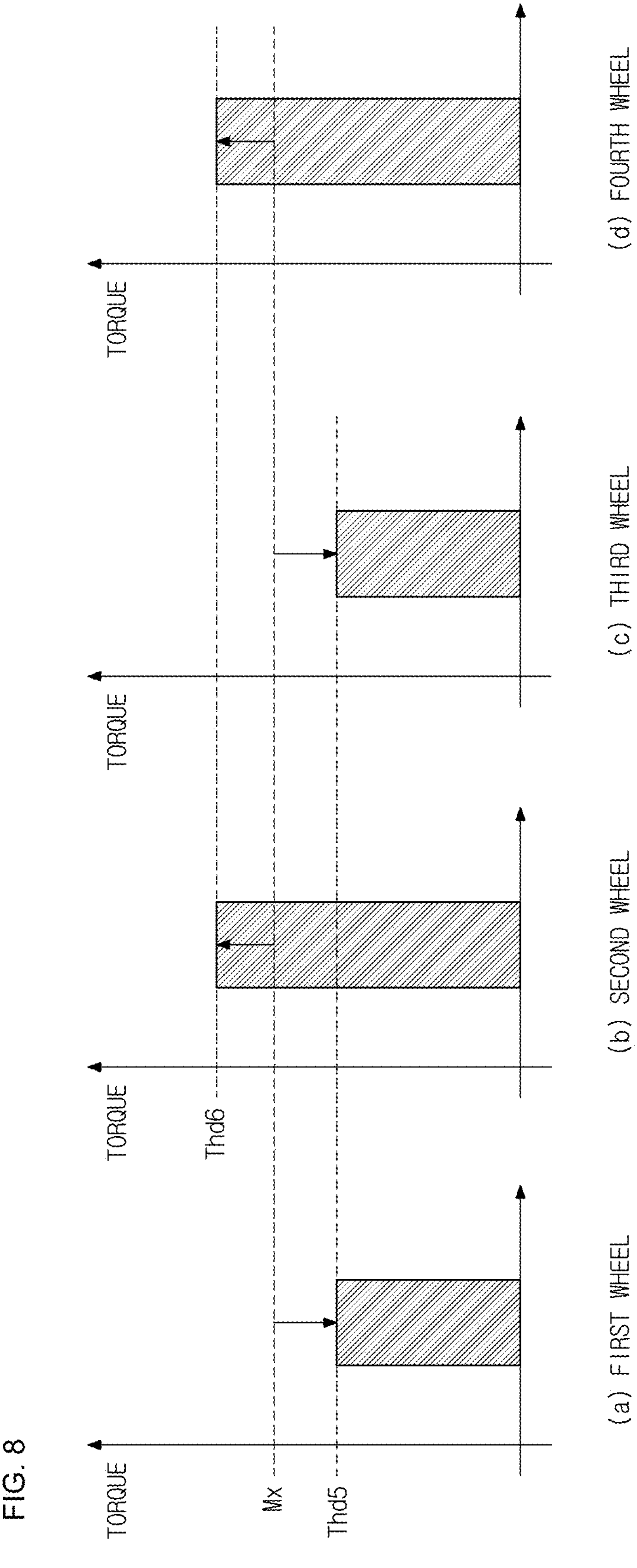
FIGS. 8 and 9 illustrate exemplary diagrams for explaining an operation of a control module when motors of a first wheel and a third wheel according to one exemplary embodiment are predicted to fail.
Figure 9:
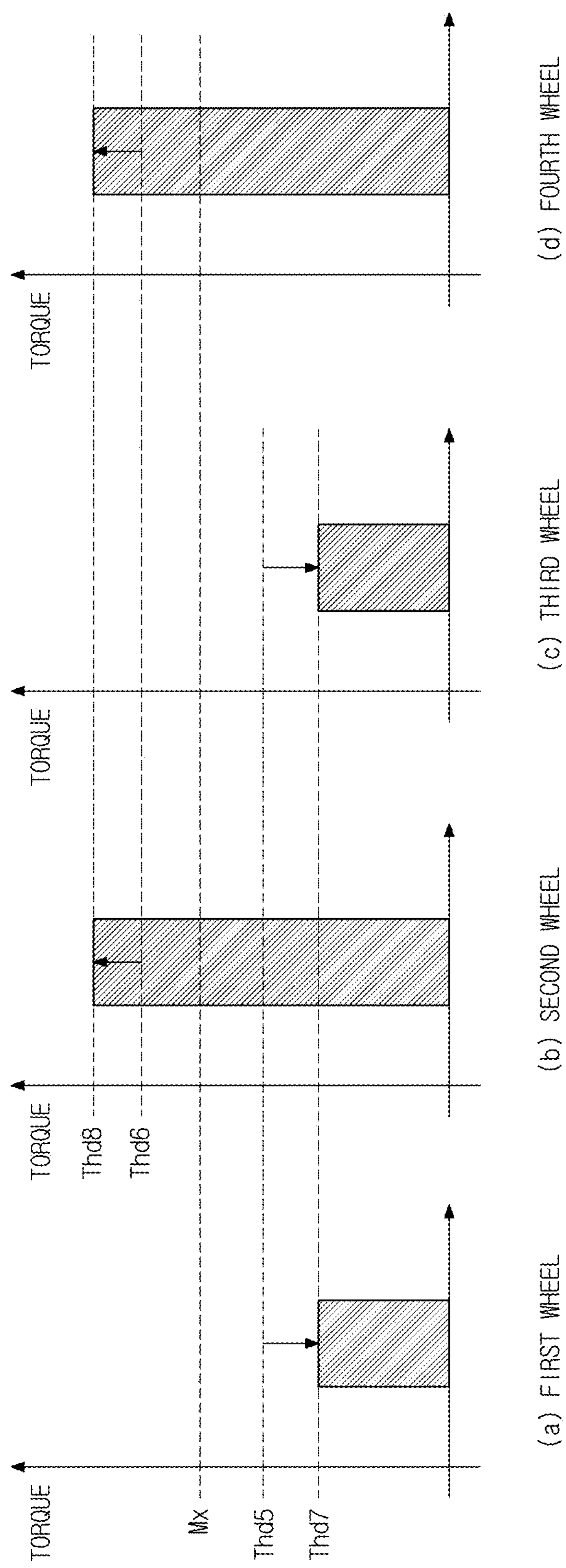

FIGS. 6 and 7 are exemplary diagrams for explaining an operation of a control module when a motor of a first wheel according to one exemplary embodiment is predicted to fail. FIGS. 8 and 9 illustrate exemplary diagrams for explaining an operation of a control module when motors of a first wheel and a third wheel according to one exemplary embodiment are predicted to fail.

Referring to FIG. 6, if a failure of the first wheel is predicted and a failure level of the first wheel is a failure level 1, the control module 320 may calculate a maximum torque value which may be generated by the first wheel at the failure level 1 and determine the calculated maximum torque value as a requested torque value of the first wheel. In this case, the control module 320 may decrease a maximum allowable value Mx of the torque which may be generated by the first wheel to a predetermined first threshold value Thd1 as illustrated in (a) of FIG. 6 and may increase maximum allowable values Mx of the torques which may be generated by the remaining wheels (second, third, and fourth wheels) to a predetermined second threshold value Thd2 as illustrated in (b), (c), and (d) of FIG. 6. Since a torque which may be generated by the first wheel is lower than a torque which may be generated in the normal state, the control module 320 reduces the maximum allowable torque value which may be generated by the first wheel and allows the remaining wheels to generate torque values higher than that in the normal state. Therefore, even though the failure of the motor provided in the first wheel is predicted, the electric mechanical brake unit of each wheel may be controlled to generate a target braking force according to the brake request of the driver.

Referring to FIG. 7, if a failure of the first wheel is predicted and a failure level of the first wheel is a failure level 1, the control module 320 may calculate a maximum torque value which may be generated by the first wheel at the failure level 2 and determine the calculated maximum torque value as a requested torque value of the first wheel. In this case, the control module 320 may decrease a maximum allowable value Mx of the torque which may be generated by the first wheel to a third threshold value Thd3 which is lower than the first threshold value Thd1 as illustrated in (a) of FIG. 7 and may increase maximum allowable values Mx of the torques which may be generated from the remaining wheels to a fourth threshold value Thd4 higher than the second threshold value Thd2 as illustrated in (b), (c), and (d) of FIG. 7. Since a torque which may be generated by the first wheel is lower than a torque which may be generated at the failure level 1, the control module 320 reduces the maximum allowable torque value which may be generated by the first wheel to be lower than that at the failure level 1 and increases the maximum allowable torque value of the remaining wheels to be higher than that at the failure level 1. Therefore, even though the performance of the motor provided in the first wheel is lowered, the electric mechanical brake unit of each wheel may be controlled to generate a target braking force according to the brake request of the driver.

Referring to FIG. 8, if a failure of the first wheel and the third wheel is predicted and failure levels of the first wheel and the third wheel are a failure level 1, the control module 320 may calculate maximum torque values which may be generated by the first wheel and the third wheel at the failure level 1 and determine the calculated maximum torque value as requested torque values of the first wheel and the third wheel. In this case, the control module 320 may decrease maximum allowable values Mx of the torques which may be generated by the first wheel and the third wheel to a predetermined fifth threshold value Thd5 as illustrated in (a) and (c) of FIG. 8 and may increase maximum allowable values Mx of the torques which may be generated from the remaining wheels (second and fourth wheels) to a predetermined sixth threshold value Thd6 as illustrated in (b) and (d) of FIG. 8. Since the torques which may be generated by the first wheel and the third wheel are lower than a torque which may be generated in the normal state, the control module 320 decreases the maximum allowable torque values which may be generated by the first wheel and the third wheel and allows the remaining wheels to generate torque values higher than that in the normal state. Therefore, even though the failure of the motors provided in the first wheel and the third wheel is predicted, the electric mechanical brake unit of each wheel may be controlled to generate a target braking force according to the brake request of the driver.

Referring to FIG. 9, if a failure of the first wheel and the third wheel is predicted and failure levels of the first wheel and the third wheel are a failure level 2, the control module 320 may calculate maximum torque values which may be generated by the first wheel and the third wheel at the failure level 2 and determine the calculated maximum torque value as requested torque values of the first wheel and the third wheel. In this case, the control module 320 may decrease maximum allowable values Mx of the torques which may be generated from the first wheel and the third wheel to a seventh threshold value Thd7 which is lower than the fifth threshold value Thd5 as illustrated in (a) and (c) of FIG. 9 and may increase maximum allowable values Mx of the torques which may be generated from the remaining wheels to an eighth threshold value Thd8 higher than the sixth threshold value Thd6 as illustrated in (b) and (d) of FIG. 9. Since the torques which may be generated by the first wheel and the third wheel are lower than a torque which may be generated at the failure level 1, the control module 320 decreases the maximum allowable torque values which may be generated by the first wheel and the third wheel to be lower than that at the failure level 1 and increase the maximum allowable torque values of the remaining wheels higher than that at the failure level 1. Therefore, even though the performance of the motors provided in the first wheel and the third wheel is lowered, the electric mechanical brake unit of each wheel may be controlled to generate a target braking force according to the brake request of the driver.

Figure 10:
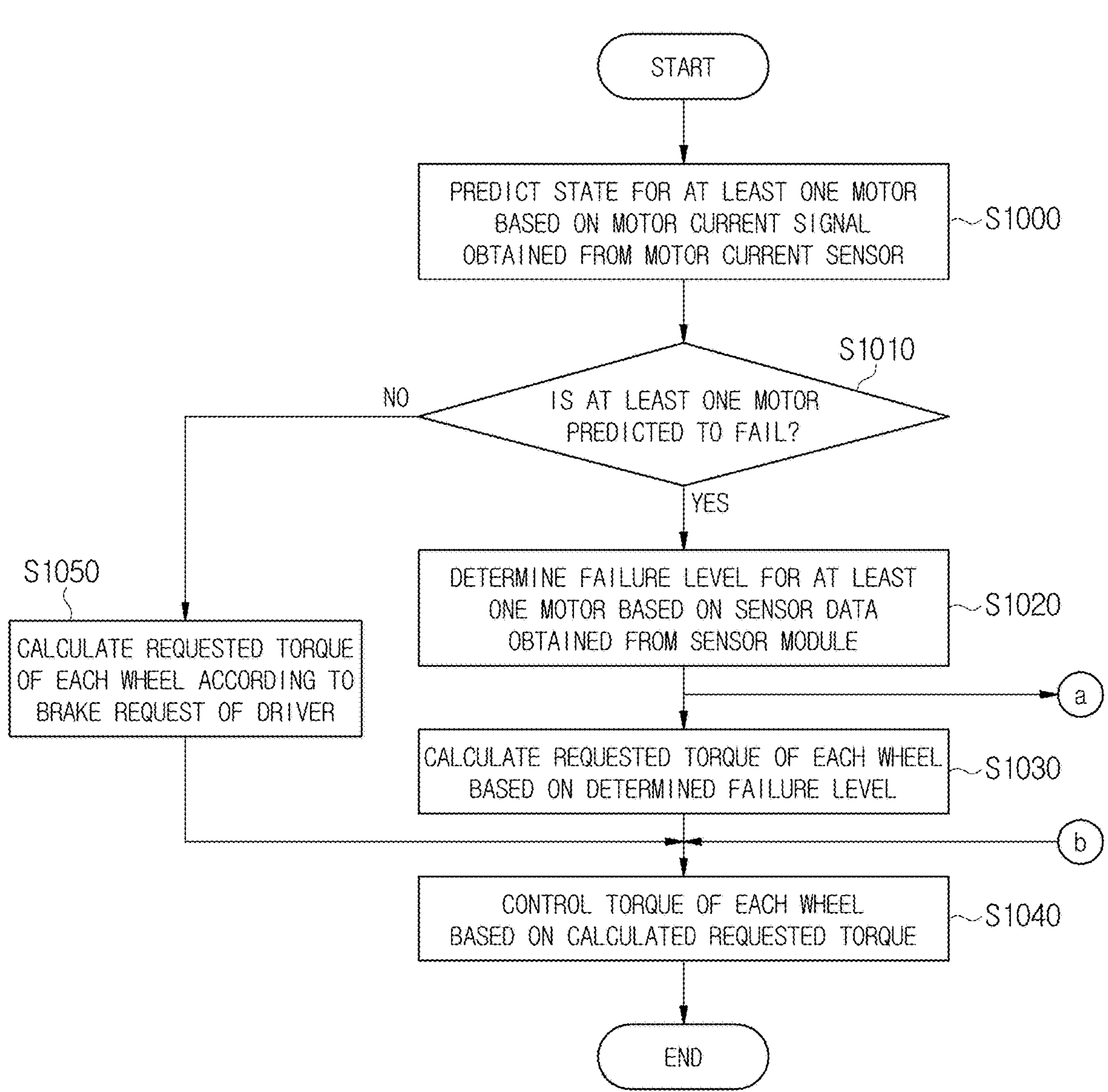
FIG. 10 illustrates a torque control operation of a controller included in a brake control unit according to one exemplary embodiment.

FIG. 10 illustrates a torque control operation of a controller included in a brake control unit according to one exemplary embodiment.

Referring to FIG. 10, the controller 210 may predict a state for at least one motor, based on a motor current signal obtained from the motor current sensor 140 (S1000). In other words, the controller 210 may predict the states of the motors of the electric mechanical brake units based on current signals of the motors detected by the motor current sensor 140. A specific operation of the controller 210 for predicting a motor state will be described with reference to FIG. 11.

Figure 11:
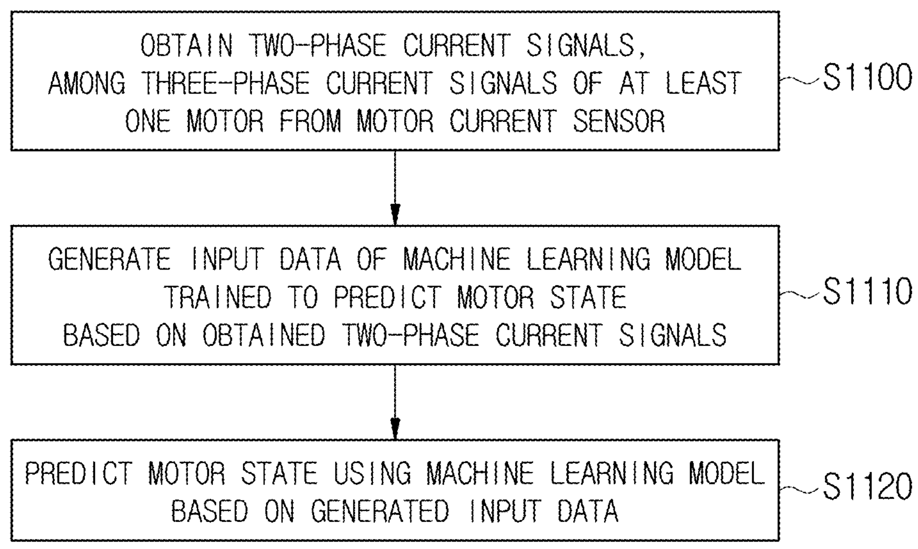
FIG. 11 illustrates an operation of a controller for predicting a motor state of each wheel according to one exemplary embodiment.

FIG. 11 illustrates an operation of a controller for predicting a motor state of each wheel according to one exemplary embodiment.

Referring to FIG. 11, the controller 210 may obtain two-phase current signals, among three-phase current signals of at least one motor from the motor current sensor 140 (S1100). For example, the controller 210 may obtain a UV-phase current signal, among UVW-phase current signals, by the FFT. The current signals of the motors may include two current signals having different phases among the three-phase current signals of the motors.

The controller 210 may generate input data of a machine learning model 305 trained to predict a motor state based on the obtained two-phase current signals (S1110). Specifically, the controller 210 may generate a W-phase current signal using the UV current signal and perform DQ transformation on the UVW-phase current signals to generate DQ-axis current signals. In other words, the controller 210 may generate a remaining phase current signal of the three-phase current signals using the two current signals having the different phases and may perform DQ transformation on the three-phase current signals to obtain DQ-axis current signals.

The controller 210 may determine frequency data and amplitude data of a U-phase current signal, frequency data and amplitude data of a V-phase current signal, and frequency data of a Q-axis current signal, among UV-phase current signals and DQ-axis current signals, as input data for predicting a motor state, by the ANOVA analysis.

The controller 210 may predict a motor state using a machine learning model 305 based on the generated input data (S1120). Specifically, as described with reference to FIG. 4, the controller 210 may input the determined input data 400 to the machine learning model 305 and obtain prediction result data 410 indicating a predicted motor state, among a normal state, a first failure state, a second failure state, and a third failure state of the motors using the machine learning model 305.

Referring to FIG. 10 again, the controller 210 determines whether at least one motor is predicted to fail (S1010) and if at least one motor is predicted to fail, may determine a failure level of at least one motor based on sensor data obtained from the sensor module S (S1020). The other words, when at least one of the predicted states of the motors indicates that at least one of the motors fails, the controller 210 may determine a failure level of the failed at least one of the motors based on the sensor data obtained from the sensor module. Here, the sensor module S may include a motor current sensor 140 and a force sensor 150 and the sensor data may include a two-phase current signal obtained by the motor current sensor 140 and a signal (braking force measurement signal) representing a braking force measured by the force sensor 150 (i.e., a signal associated with a braking force measured by the force sensor 150).

Specifically, the controller 210 may perform DQ transformation on the two-phase current signals to obtain DQ-axis current signals and may determine a failure level of at least one motor in consideration of correlation between the DQ-axis current signals and the braking force measurement signal and the motor performance degradation. For example, if a difference between each signal and a normal signal is equal to or higher than a predetermined first threshold difference, the controller 210 may determine the failure level as a failure level 1. According to various exemplary embodiments, the controller 210 may determine whether to reach a target braking force, a braking response, and whether to reach a requested braking force and if at least one of them is not satisfied, the controller 210 may determine the failure level as a failure level 2.

As described above, when the failure level of at least one motor is determined, the controller 210 may calculate a requested torque of each wheel based on the determined failure level (S1030) and control a torque of each wheel based on the calculated requested torque (S1040). In other words, the controller 210 may calculate a requested torque of each of the wheels based on the determined failure level of the failed at least one of the motors. In order to calculate the requested torque of each wheel, as described above in FIGS. 6 to 9, the controller 210 may decrease a maximum allowable torque value of a wheel corresponding to a motor which is predicted to fail according to a failure level (that is, a failure level 1 or a failure level 2) for at least one motor to be lower than a reference value (normal value) and may increase a maximum allowable torque value of the wheel corresponding to a motor in a normal state to be higher than a reference value. Accordingly, even though failure occurs in at least one motor, the target braking force according to the brake request of the driver may be generated. According to various exemplary embodiments, an operation of the controller when a failure level of at least one motor is determined as a failure level 2 will be described with reference to FIG. 12.

Figure 12:
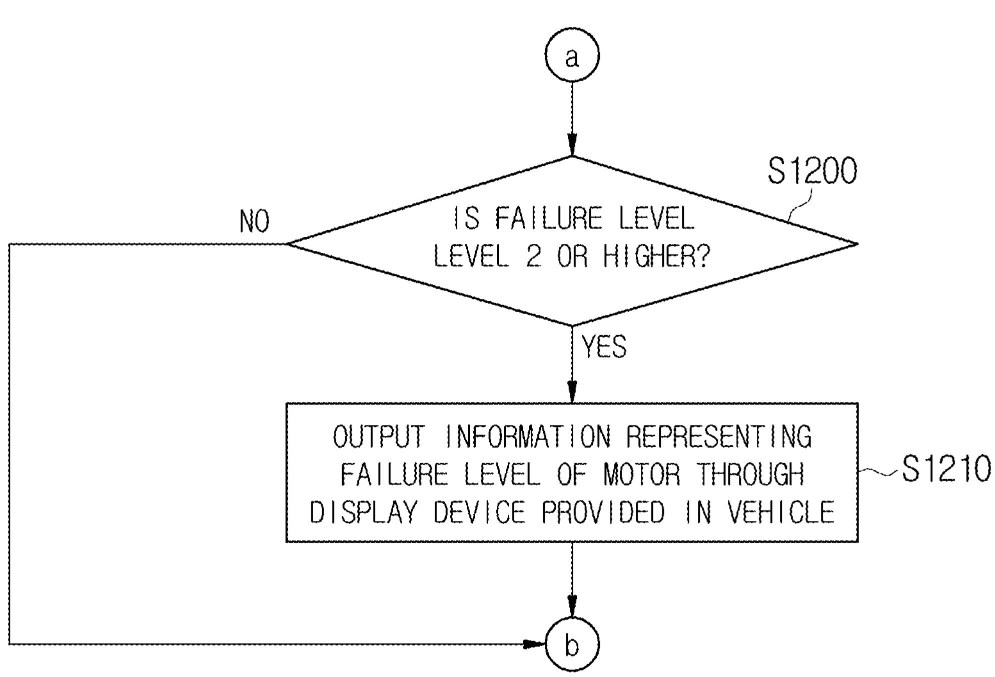
FIG. 12 illustrates an operation of a controller when a failure level of at least one motor according to one exemplary embodiment is determined as failure level 2.

FIG. 12 illustrates an operation of a controller when a failure level of at least one motor according to one exemplary embodiment is determined as a failure level 2.

Referring to FIG. 12, the controller 210 which proceeds from (a) of FIG. 10 to (a) of FIG. 12 determines whether a failure level is level 2 or higher (S1200). If the determined failure level of the failed at least one of the motors is a failure level 2 or higher, the controller may output information representing the failure level of the motor through a display device provided in the vehicle (S1210) and proceed from (b) of FIG. 12 to (b) of FIG. 10. In other words, the controller 210 may control a display to output information indicating the determined failure level of the failed at least one of the motors. For example, the controller 210 may output the information through a human-machine interface (HMI) provided in the vehicle. According to various exemplary embodiments, the controller 210 may output information by voices through an audio device to allow the driver to recognize, but is not limited thereto and various methods for allowing the driver to recognize may be used.

Referring to FIG. 10 again, if at least one motor is not predicted to fail or at least one motor is predicted to be normal, the controller 210 may calculate a requested torque of each wheel according to a brake request of the driver (S1050) and control a torque of each wheel based on the calculated requested torque (S1040).

As described above, according to the disclosed exemplary embodiment, the motor failure is predicted in advance based on the three-phase current signals of the three-phase motor to prevent the safety accident of the vehicle and minimize the damage.

Further, a requested torque of a wheel corresponding to the motor which is predicted to fail and requested torques of wheels corresponding to the remaining motors are adjusted according to the failure level of at least one motor which is predicted to fail. Accordingly, even though a failure for at least one motor is predicted, the target braking force according to the driver's brake request may be generated.

Further, the motor failure may be predicted based on the three-phase current signals of the motor current sensor without adding a sensor for predicting a failure of the motor.

Further, safety of a diagnostic system may be provided through pre-diagnosis rather than post-diagnosis of the motor.

In the meantime, the disclosed exemplary embodiments may be implemented as a recording medium in which a computer executable instruction is stored. The instruction may be stored as a program code and when it is executed by a processor, a program module is generated to perform operations of the disclosed exemplary embodiments. The recording medium may be implemented as a computer readable recording medium.

The computer readable recording media include all kinds of recording media in which instructions, which are capable of being deciphered by a computer, are stored. For example, the recording media may include a read only memory (ROM), a random access memory (RAM), a magnetic tape, a magnetic disk, a flash memory, and an optical data storage device.

Machine readable storage media may be provided as non-transitory storage media. Here, 'non-transitory' means that the storage medium is a tangible device and does not contain signals (e.g., electromagnetic waves), and the term does not distinguish between cases where data is stored semi-permanently or temporarily on the storage medium. For example, "non-transitory storage medium" may include a buffer in which data is temporarily stored.

As described above, the disclosed exemplary embodiments have been described with reference to the accompanying drawings. Those skilled in the art may understand that the present disclosure can be embodied in other forms than the disclosed embodiments without changing the technical spirit or essential features of the present disclosure. The disclosed exemplary embodiments are illustrative and should not be construed as limiting

What is claimed is:

1. A brake system, comprising:
- a sensor module including a motor current sensor and a force sensor;
- electric mechanical brake units mounted to wheels of a vehicle and including motors, respectively; and
- a controller configured to control one or more of the electric mechanical brake units,
- wherein the controller is configured to:
- predict states of the motors of the electric mechanical brake units based on current signals of the motors detected by the motor current sensor,
- when at least one of the predicted states of the motors indicates that at least one of the motors fails, determine a failure level of the failed at least one of the motors based on sensor data obtained from the sensor module,
- calculate a requested torque of each of the wheels based on the determined failure level of the failed at least one of the motors, and
- control a torque of each of the wheels based on the calculated requested torque of each of the wheels.

2. The brake system according to claim 1, wherein the states of the motors include normal, bearing failure, rotor imbalance, or axis misalignment.

3. The brake system according to claim 2, wherein:
- the current signals of the motors include two current signals having different phases among three-phase current signals of the motors, and
- the controller is configured to control to generate a remaining phase current signal of the three-phase current signals using the two current signals having the different phases, perform direct quadrature (DQ) transformation on the three-phase current signals to obtain DQ-axis current signals, and generate input data for a machine learning model based on the three-phase current signals and the DQ-axis current signals.

4. The brake system according to claim 3, wherein the controller is configured to obtain prediction result data representing a predicted motor state using the machine learning model trained to predict a motor state based on the input data including frequency data and amplitude data of a first phase current signal, frequency data and amplitude data of a second phase current signal, among three-phase current signals, and frequency data of a quadrature-axis (Q-axis) current signal.

5. The brake system according to claim 4, wherein the prediction result data includes a plurality of labels including a label corresponding to the normal, a label corresponding to the bearing failure, a label corresponding to the rotor imbalance, and a label corresponding to the axis misalignment, and a prediction probability value for each of the plurality of labels.

6. The brake system according to claim 5, wherein the controller is configured to determine a label having the prediction probability value corresponding to the label corresponding to the normal, among the plurality of labels, which is equal to or higher than a threshold probability value as the motor state.

7. The brake system according to claim 6, wherein the threshold probability value is calculated by applying a predetermined weight to the prediction probability value corresponding to the label corresponding to the normal.

8. The brake system according to claim 4, wherein:
- the sensor data includes a signal associated with a braking force measured by the force sensor, and
- the controller is configured to determine the failure level based on the signal associated with the measured braking force and the DQ-axis current signals.

9. The brake system according to claim 8, wherein the controller is configured to, if a direct-axis (D-axis) current value and a Q-axis current value of a current signal of one of the motors increase to be equal to or higher than a predetermined current value and the measured braking force decreases to be lower than a predetermined braking force, predict a state of the one of the motors as one of the bearing failure or the rotor imbalance.

10. The brake system according to claim 8, wherein the controller is configured to, if a D-axis current value and a Q-axis current value of a current signal of one of the motors decrease to be lower than a predetermined current value and the measured braking force decreases to be lower than a predetermined braking force, predict a state of the one of the motors as the axis misalignment.

11. The brake system according to claim 8, wherein:
- the failure level includes a higher failure level and a lower failure level which has a failure level lower than the higher failure level, and
- the controller is configured to, if the determined failure level of the failed at least one of the motors is the lower failure level among the higher and lower failure levels, control a display to output information indicating the determined failure level of the failed at least one of the motors.

12. The brake system according to claim 11, wherein the controller is configured to:

determine whether the measured braking force reaches a target braking force within a predetermined first threshold time, and if the measured braking force does not reach the target braking force within the first threshold time, determine the failure level as the lower failure level among the higher and lower failure levels.

13. The brake system according to claim 12, wherein the controller is configured to:

determine whether a brake response time when the measured braking force reaches the target braking force is within a predetermined second threshold time, and if the brake response time when the measured braking force reaches the target braking force is out of the second threshold time, determine the failure level as the lower failure level among the higher and lower failure levels.

14. The brake system according to claim 1, wherein the controller is configured to:

determine a requested torque value of a wheel corresponding to the at least one motor, which is predicted to fail among the motors of the electric mechanical brake units, to be lower than a predetermined threshold requested torque value, and determine one or more requested torque values of wheels corresponding another motor or other motors, which are not predicted to fail among the motors of the electric mechanical brake units, to be equal to or higher than the predetermined threshold requested torque value.

15. A method of controlling a brake system, the method comprising:

predicting states of motors of electric mechanical brake units based on current signals of the motors detected by a motor current sensor;

when at least one of the predicted states of the motors indicates that at least one of the motors fails, determining a failure level of the failed at least one of the motors based on sensor data obtained from a sensor module including the motor current sensor;

calculating a requested torque of each wheel based on the determined failure level of the failed at least one of the motors; and controlling a torque of the each wheel based on the calculated requested torque of the each wheel.

16. The method according to claim 15, wherein the current signals of the motors include two current signals having different phases among three-phase current signals of the motors, and wherein the method further includes:

generating a remaining phase current signal of the three-phase current signals using the two current signals having the different phases;

performing direct quadrature (DQ) transformation on the three-phase current signals to obtain DQ-axis current signals; and generating input data for a machine learning model based on the three-phase current signals and the DQ-axis current signals.

17. The method according to claim 16, further comprising:

obtaining prediction result data representing a predicted motor state using the machine learning model trained to predict the motor state based on the input data including frequency data and amplitude data of a first phase current signal, frequency data and amplitude data of a second phase current signal, among the three-phase current signals, and frequency data of a quadrature-axis (Q-axis) current signal.

18. The method according to claim 17, wherein the state includes one of normal, bearing failure, rotor imbalance, or axis misalignment, wherein the prediction result data includes a label corresponding to the normal, a label corresponding to the bearing failure, a label corresponding to the rotor imbalance, a label corresponding to the axis misalignment, and a prediction probability value for each of the plurality of labels, and wherein the predicting of the states of the motors of the electric mechanical brake units includes:

determining a label having the prediction probability value corresponding to the label corresponding to the normal, among the plurality of labels, which is equal to or higher than a threshold probability value as the motor state.

19. The method according to claim 17, wherein the sensor module further includes a force sensor and the sensor data includes a braking force measurement signal obtained from the force sensor, and wherein the determining of the failure level of the failed at least one of the motors includes determining the failure level based on the signal associated with the measured braking force and the DQ-axis current signals.

20. The method according to claim 17, wherein the failure level includes a higher failure level and a lower failure level which has a failure level lower than the higher failure level, and wherein the controlling method further includes, if the determined failure level of the failed at least one of the motors is the lower failure level among the higher and lower failure levels, displaying information indicating the determined failure level of the failed at least one of the motors.

* * * * *